United States Patent [19]
Haderle et al.

[11] Patent Number: 5,940,822
[45] Date of Patent: Aug. 17, 1999

[54] ENCODING METHOD OF MEMBERS RELATED BY MULTIPLE CONCEPT OR GROUP HIERARCHIES AND IDENTIFICATION OF MEMBERS IN A CORPUS OR A DATABASE THAT ARE DESCENDANTS OF ONE OR MORE SELECTED CONCEPTS OR GROUPS FROM THE ENCODING

[75] Inventors: Donald J. Haderle, Los Gatos; Balakrishna Raghavendra Iyer, San Jose, both of Calif.

[73] Assignee: International Business Machines Corporation, Armonk, N.Y.

[21] Appl. No.: 08/921,197

[22] Filed: Aug. 29, 1997

[51] Int. Cl.⁶ .................................................. G06F 17/30
[52] U.S. Cl. ....................... 707/3; 707/2; 707/4; 707/101
[58] Field of Search ............................... 707/2, 3, 4, 101

[56] References Cited

U.S. PATENT DOCUMENTS

| | | | |
|---|---|---|---|
| 5,289,567 | 2/1994 | Roth | 3295/133 |
| 5,495,605 | 2/1996 | Cadot | 707/3 |
| 5,619,615 | 4/1997 | Pitchaikani et al. | 395/11 |
| 5,659,725 | 8/1997 | Levy et al. | 707/2 |
| 5,694,591 | 12/1997 | Du et al. | 707/2 |
| 5,701,454 | 12/1997 | Bhargava et al. | 707/2 |
| 5,706,495 | 1/1998 | Chadha et al. | 707/2 |
| 5,761,654 | 6/1998 | Tow | 707/2 |

OTHER PUBLICATIONS

IBM Technical Disclosure Bulletin, "Evaluation of Column Functions on Grouped Data Ordering", vol. 32, No. 10B, Mar. 1990, pp. 385–386.

Iyer, Balakrishna R., et al., "Data Compression Support in Databases", Technology Institute, International Business Machines Corporation, Software Solutions Division, Santa Teresa Laboratory, Apr. 1994, pp. 1–26.

Kerin, Roger A., et al., "Product Hierarchy and Brand Strategy Influences on the Order of Entry Effect for Consumer Packaged Goods", *J. Prod. Innov. Manag.*, vol. 13, 1996, Elsevier Science Inc., pp. 21–34.

Klug, Anthony, "Access Paths in the 'Abe' Statistical Query Facility", Proceedings of the International Conference on Management of Data, Jun. 2–4, 1982, Orlando, Florida, ACM SIGMOD Association for Computing Machinery, pp. 161–173.

Internet article, http://fas.sfu.ca/cs/conf/dmkd97.html, "Workshop on Research Issues on Data Mining and Knowledge Discovery (DMKD'97) in cooperation with ACM-–SIGMOD'97, Tuscon, Arizona, May 11, 1997", DMKD'97 Pre–Conf. Data Mining Workshop: Call For Participation and Registration (entire document).

*Primary Examiner*—Paul V. Kulik
*Assistant Examiner*—Jean R. Homere
*Attorney, Agent, or Firm*—Merchant, Gould, Smith, Edell, Welter, & Schmidt

[57] ABSTRACT

A method, apparatus, and article of manufacture for an encoder for encoding members in a concept hierarchy. A query is executed in a computer. The query is performed by the computer to retrieve data from a database stored on a data storage device connected to the computer. Members in the database that are related by one or more concept hierarchies are encoded. Then, members in one of the concept hierarchies that are descendants of one or more selected concepts are identified based on the encoding.

18 Claims, 4 Drawing Sheets

ENCODING METHOD OF MEMBERS RELATED BY MULTIPLE CONCEPT OR GROUP HIERARCHIES AND IDENTIFICATION OF MEMBERS IN A CORPUS OR A DATABASE THAT ARE DESCENDANTS OF ONE OR MORE SELECTED CONCEPTS OR GROUPS FROM THE ENCODING

BACKGROUND OF THE INVENTION

1. Field of the Invention

This invention relates in general to a computer-implemented encoding system, and more particularly, to an encoding system for concept or group hierarchies.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

The definitions for SQL provide that a RDBMS should respond to a particular query with a particular set of data given a specified database content, but the method that the RDBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of doing the query.

It is common in Internet text mining and Business Intelligence applications for atomic data in a relational database to be related by one or more hierarchies of concepts or groups. A "concept" or "group" is a generalization of one or more keywords or parts of parsed text. A text search query against a large corpus (i.e., collection of data) may be modeled as a search for various concepts or groups.

For both Internet text mining and Business Intelligence applications, the computation of aggregate functions for each individual concept or group is a basic, often repeated, operation. The aggregate grouping operator is used to rank one collection versus another. A. Klug, *Access Path in the "Abe" Statistical Query Facility*, Proc. ACM SIGMOD, 1982, pp. 161–172, which is incorporated by reference herein, teaches that special treatment should be given to aggregation of groups. Efficiency for the aggregate grouping operator was addressed in D. J. Haderle, and E. J. Lynch, *Evaluation of Column Function on Grouped Data During Data Ordering*, IBM Technical Disclosure Bulletin, Mar. 10, 1990, pp. 385–386, which is incorporated by reference herein.

The following example is from the Business Intelligence domain. One skilled in the art would recognize that there are equivalent examples in the domain of Internet text mining. Example concepts or groups are (sales by) STATE(s), (sales by) CITY(s), etc. Concepts and groups have members, and, typically, members are related by a hierarchy. For example, for the group STATE(s), one natural hierarchy is based on geography (e.g., East Coast states, Southwest states, Midwest states, Western states, etc.).

Members can be related by more than one hierarchy. For example, in a department store, individual products are related hierarchically by product categories (e.g., housewares, hardware, etc.), as described in R. A. Kevin, D. Kalyanaraman, and D. J. Howard, *Product Hierarchy and Brand Strategy Influence on the Order of Entry Effect for Consumer Packaged Goods*, Journal of Product Innovation Management, Vol. 13, No. 1. Jan. 1996, which is incorporated by reference herein. In addition, they are also related by employees of the department store, commonly referred to as buyers, who are responsible for buying the products, and related by the management structure of these employees.

If members of the hierarchy were represented just by their names, e.g., "12 oz. Tide" in a table (e.g., a DETAIL table) of transaction records, conventional systems employ one of two methods to compute the aggregations.

In the first method, a sequence of joins are performed between the DETAIL table and other tables that carry a map of the hierarchy. The number of joins is determined by the maximum depth of the hierarchy. After the sequence of joins, this method performs aggregations. This method is described in more detail in M. Wang and B. Iyer, *Efficient Roll-Up and Drill-Down Analysis in Relational Databases*, SIGMOD Data Mining Workshop, 1997, which is incorporated by reference herein. The first method does not clearly address the issue of input/output ("I/O") efficiency and is also subject to the known "quirkiness" of commercial RDBMS optimizers that sometimes cause the RDBMS to execute a query sub-optimally.

The second technique stores the names of ancestors of members along with the members in the DETAIL table. This second technique requires a large amount of memory for storing the names of the ancestors. Therefore, the second method is wasteful of space.

There is a need in the art for an improved method of computing aggregations.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented encoder for encoding members in a concept hierarchy.

In accordance with the present invention, a query is executed in a computer. The query is performed by the computer to retrieve data from a database stored on a data storage device connected to the computer. Members in the database that are related by one or more concept hierarchies are encoded. Then, members in one of the concept hierarchies that are descendants of one or more selected concepts are identified based on the encoding.

An object of the invention is to provide an improved system for encoding members of hierarchies. Another object of the present invention is to encode members of multiple, related concept hierarchies. Yet another object of the present invention is to identify descendants of a member based on the encoding.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
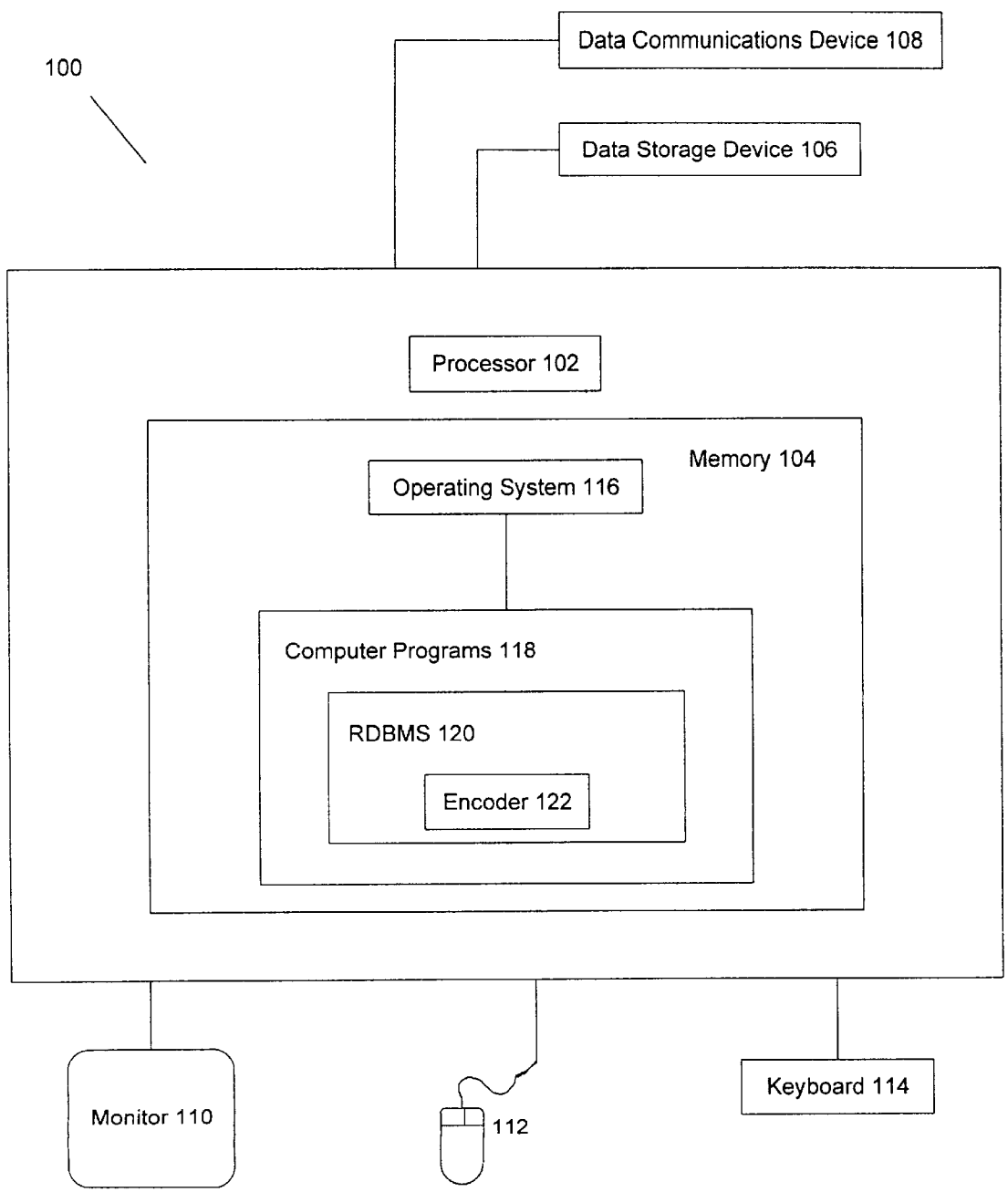
FIG. 1 is an exemplary hardware environment used to implement the preferred embodiment of the invention.

FIG. 1 is an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112, and keyboard 114. It is envisioned that attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 116, such as MVS™, AIX™, OS/2™, WINDOWS NT™, WINDOWS™, UNIX™, etc. The operating system 116 is booted into the memory 102 of the computer 100 for execution when the computer 100 is powered-on or reset. In turn, the operating system 116 then controls the execution of one or more computer programs 118 by the computer 100. The present invention is generally implemented in these computer programs 118, which execute under the control of the operating system 116 and cause the computer 100 to perform the desired functions as described herein. Alternatively, the present invention may be implemented in the operating system 116 itself. In particular, the present invention is typically implemented using relational database management system (RDBMS) software 120, such as the DB2 product sold by IBM Corporation, although it may be implemented with any database management system (DBMS) software.

The RDBMS software 120 receives commands from users for performing various search and retrieval functions, termed queries, against one or more databases stored in the data storage devices 106. In the preferred embodiment, these queries conform to the Structured Query Language (SQL) standard, although other types of queries could also be used without departing from the scope of the invention. The queries invoke functions performed by the RDBMS software 120, such as definition, access control, interpretation, compilation, database retrieval, and update of user and system data. The RDBMS software 120 invokes the encoder 122 to perform encoding.

The operating system 116 and computer programs 118 are comprised of instructions which, when read and executed by the computer 100, causes the computer 100 to perform the steps necessary to implement and/or use the present invention. Generally, the operating system 116 and/or computer programs 118 are tangibly embodied in and/or readable from a device, carrier, or media, such as memory 102, data storage devices 106, and/or data communications devices 108. Under control of the operating system 116, the computer programs 118 may be loaded from the memory 102, data storage devices 106, and/or data communications devices 108 into the memory 102 of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

The Encoder

The present invention provides an encoder 122 that provides encoding of members related by multiple concept or group hierarchies. After encoding, the encoder 122 can identify members in a corpus or a database that are descendants of one or more selected concepts or groups in one or more hierarchies based on the encoding. The concepts or groups are known as ancestors. In one pass through the corpus or database, the number of occurrences of selected concepts or groups are identified, regardless of the number of concepts or groups in a hierarchy and regardless of the number of hierarchies.

The encoder 122 provides a simple but elegant system to encode members belonging simultaneously to multiple hierarchies and solves the problems of the two conventional systems mentioned earlier that compute aggregations. In one embodiment, it is recommended that the present invention be combined with a method to compress codes using a compression system which exhibits decoding efficiency both in central processing unit ("CPU") cycles and memory usage. One skilled in the art, however, would recognize that the present invention may be used without a compression system.

In A. V. Aho, J. E. Hopcroft, and J. D. Ullman, *The Design and Analysis of Algorithms,* Addisson-Wesley, 1974, an observation was made that, if a binary tree is labeled by increasing natural numbers, during a postorder traversal of the tree, whether one node is a child of another can be determined in an amount of time that does not depend on the number of nodes in the tree. The encoder 122 uses this concept to take a partial order induced by a hierarchy and convert it into a total order, so that all children of an ancestor fall into one range (i.e., of values) of this labeling. The encoder 122 extends this idea to encode multiple hierarchies by yet another elegant form of code construction.

Data captured by point-of-sale ("POS") systems, is the primary driver of the market for Business Intelligence applications providing data analysis. Consumer Packaged Goods ("CPG") manufacturers, retailers, and supermarkets are traditional users of these applications. More recently pharmaceutical drug manufacturers and pharmacies have also begun using these applications.

The following example will focus on a Super Department Store. Each item in the store is labeled with a stockable unit number ("SKU"). The SKU is based on a natural hierarchy and is used to located that item in the store.

Figure 2:
FIG. 2 illustrates a tree structure stored on a data storage device that represents a hierarchy of products sold at a Super Department Store.

FIG. 2 illustrates a tree structure stored on a data storage device 106 that represents a hierarchy of products sold at a Super Department Store 200. A tree structure has a root node from which all other nodes in the tree depend. A node from which other nodes depend is called a parent node. Nodes that depend from another node are called child nodes. A child node is said to be a descendent of a parent node, and a parent node is said to be an ancestor of a child node. For example, the root node "Super Department Store 28" is an ancestor node of each other node in the tree, but it does not have an ancestor itself. The node "Apparel 14" has an ancestor node "Super Department Store 28" and child nodes "Men 0", "Shoes 1", "Kids 6", and "Women 13". Nodes that have ancestor nodes and no child nodes are termed leaf nodes. For instance, node "Petites 7" is a leaf node that has an ancestor node "Women 13" and no child nodes.

The nodes in FIG. 2 represent members of a domain. Each of the members has an associated label (e.g., number) for identifying the node in the tree. One skilled in the art would recognize that the illustration provided in FIG. 2 is an example only and that other hierarchies could be used with the present invention.

The plunging cost of disk and processors are responsible for 100's of millions, perhaps even billions, of transactions being recorded on magnetic media reachable by a database manager. Roll-up, i.e., accumulating total sales for all descendent SKUs of selected members of the hierarchy, is a generic operation for Business Intelligence analysis. For example, with reference to the Super Department Store hierarchy 200, an analyst at the Super Department Store headquarters, may wish to roll-up sales on "Apparel 14" for "Women 13" and "Supermarket 27" for analyzing relative performance of the store in the two categories.

On-line analytical processing ("OLAP") tools such as Arbor's ESSBASE, Informix's METACUSE, etc., store frequently computed aggregations in essentially the main memory database on a client personal computer ("PC"). If a pre-computed aggregate is not available in the main memory database of the client PC, an SQL query is issued against the database manager hosting the Detail table data.

One efficient execution method for the query is a single pass over the data in the Detail table. The encoder 122 demonstrates that if members of the hierarchy are labeled by a postorder traversal of the tree representing one hierarchy, all children of an ancestor are bounded by the labels of the ancestor and the lowest numbered child. Next, if the members appearing in the database were encoded by such labels, multiple aggregates of members and all their descendants are computable in one pass of the data, as described further in M. Wang and B. Iyer, *Efficient Roll-Up and Drill-Down Analysis in Relational Databases,* SIGMOD Data Mining Workshop, 1997, which is incorporated by reference herein. For example, in the Super Department Store hierarchy 200 of FIG. 2, labels for all SKU's in the "Apparel 14" for "Women 13" member are in the range of (7, 14) and labels for SKU's in the "Supermarket" member are in the range (24, 27).

Figure 3:
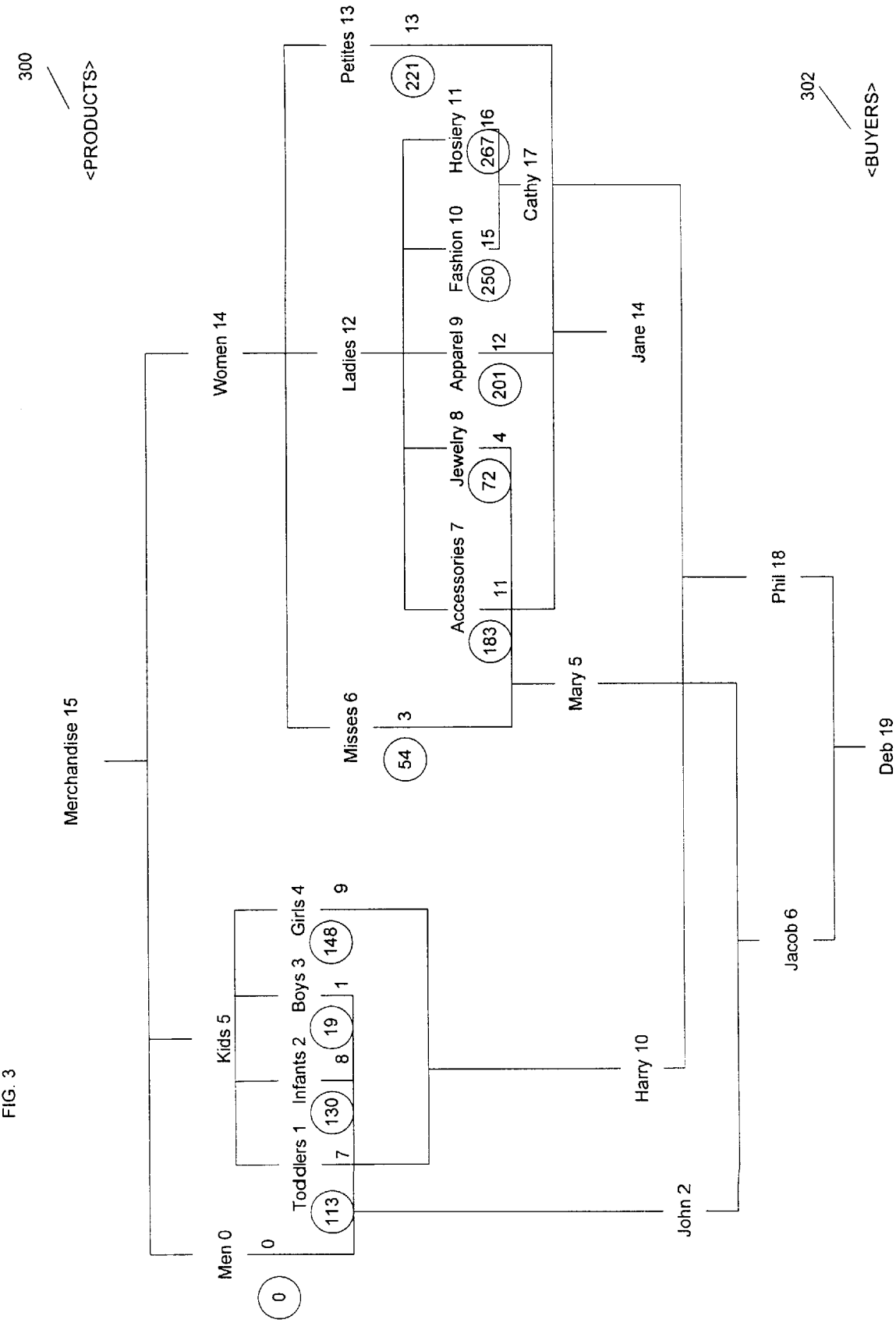
FIG. 3 illustrates a tree structure stored on a data storage device that represents two hierarchies by which items at a Super Department Store may be related.

FIG. 3 illustrates a tree structure stored on a data storage device 106 that represents two hierarchies by which items at a Super Department Store may be related. One of the hierarchies is a products hierarchy 300, which includes some of the members of the Super Department Store hierarchy 200, and the other hierarchy is a buyers hierarchy 302 representing buyers who purchase products for the Super Department Store. FIG. 3 illustrates that members are related by more than one hierarchy, i.e., products 300 and buyers 302. For example, John 2 is the buyer for "Men 0", "Toddlers 1", "Infants 2", "Boys 3", and "Girls 4" products.

For a single hierarchy, the encoder 122 demonstrates that predicates that capture a range of consecutive values identify a member of the hierarchy and all its descendants. For the example hierarchies illustrated in FIG. 3, users may want a report of the aggregate sales of all "Kids 1" products purchased by buyers managed by "Phil 18". The encoder 122 encodes members with labels from which the encoder 122 can determine whether the member is a descendant of a specified ancestor in any hierarchy. In the worst case, the time taken to perform encoding is proportional to the number of hierarchies. The label is used for multiple hierarchies in a similar manner as the label for a single hierarchy.

Consider the hierarchy on members illustrated in FIG. 3. The encoder 122 first traverses the products hierarchy 300 in postorder fashion and assigns non-negative integers to each member, in natural order. For example, the encoder 122 assigns the label 1 to the member "Toddler" for the products hierarchy 300. As there are 16 members of the products hierarchy 300, the encoder 122 uses 16 integers (0 through 15 inclusive) for labeling.

Next, the encoder 122 traverses the buyers hierarchy 302 in postorder fashion and assigns non-negative integers to each member, in natural order. For example, the encoder 122 assigns the label 7 to the member "Toddler" for the buyers hierarchy 302.

The encoder 122 encodes each member of the products hierarchy 300 with a combined code derived from multiplying the label assigned to the member for the buyers hierarchy 302 with the maximum number of labels assigned (e.g., 16) in the products hierarchy 300 and adding the label assigned to the member for the products hierarchy 300. For example, the encoder 122 computes a combined code for the member "Toddler" as 7×16+1=113.

When the encoder 122 finds this combined code with the member, the encoder 122 can determine the labels for the member from each hierarchy of which it is a member (e.g., the products and buyers hierarchies 300, 302). The encoder 122 determines the label for the member "Toddler" in the products hierarchy 300 by computing the combined code mod the maximum number of labels assigned and subtracting the label assigned to the member for the products hierarchy 300 (e.g., ((113 mod 16)−1)=1). The encoder 122 determines the label for the member "Toddler" in the buyers hierarchy 302 by subtracting the label assigned to the member for the products hierarchy 300 from the combined code and dividing this result by the maximum number of labels (e.g., ((113−1)/16)=7)).

Referring back to the products and buyers hierarchies 300 and 302 illustrated in FIG. 3, once the combined code 113, is unraveled into code 1 for the products hierarchy 300, the encoder 122 can determine that the member is a descendant of concept "Kids", which has a range (1, 5), in the products hierarchy 300. Once the combined code 113, is unraveled into code 7 for the buyers hierarchy 302, the encoder 122 can determine that the member is a descendant of "Phil", which has a range (7, 18) in the buyers hierarchy 302.

The following discussion provides a more formal description of the present invention. First, let h<i> denote the number of nodes in the tree representing hierarchy <i> (e.g., for hierarchy 1, the number of nodes is represented by h1). Then, assume that there are four hierarchies, and each member defined in a Detail table belongs to every hierarchy. For the hierarchies, h1 is not larger (in terms of number of members, i.e., nodes in the tree) than h2 which, in turn, is not larger than h3, and that, in turn, is not larger than h4. Independent traversals of the four hierarchies produce four labels (i.e., codes c1, c2, c3, c4) for each leaf, for hierarchies 1, 2, 3 and 4, respectively.

The encoder 122 computes the combined code for a leaf appearing in these four hierarchies with the following formula:

$$\text{combined code} = c1 + c2 \times h1 \times h2 + c4 \times h1 \times h2 \times h3$$

Upon obtaining the combined code of a member, the encoder 122 computes the labels for the member in its various hierarchies with the following formulas:

```
c1 = combined code % h1                              (since h1 <= h2)
c2 = ((combined code - c1)/h1)%h2                    (since h2 <= h3)
c3 = ((combined code - c1 - c2 × h1)/(h1 × h2))%h3   (since h3 <= h4)
c4 = ((combined code - c1 - c2 × h1 - c3 × h1 × h2)/(h1 × h2 × h3))
```

Although the above example was directed to members within four hierarchies, one skilled in the art would recognize that the formulas given above could be tailored for members related by any number of hierarchies.

Figure 4:
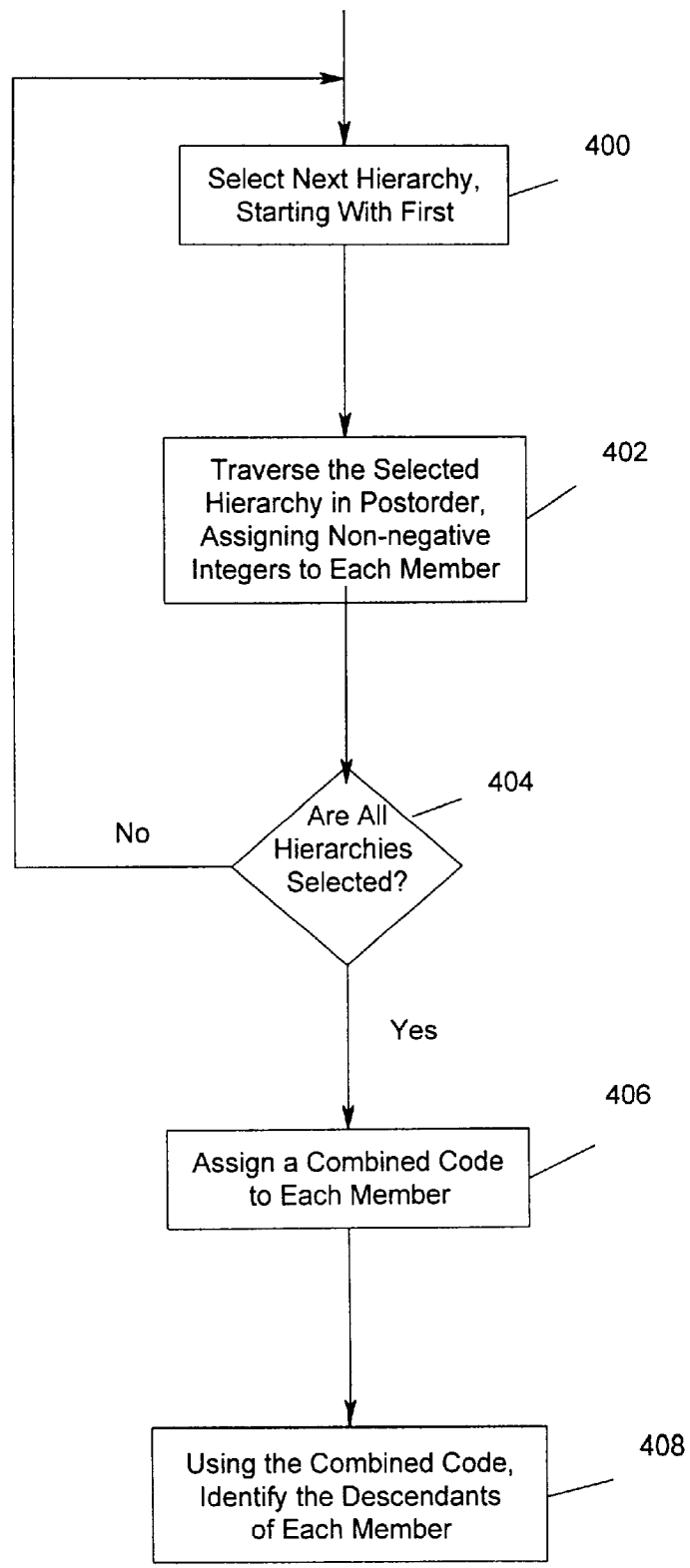
FIG. 4 is a flow diagram illustrating the steps performed by the encoder.

FIG. 4 is a flow diagram illustrating the steps performed by the encoder 122. In Block 400, the encoder 122 selects the next hierarchy, starting with the first. In Block 402, the encoder 122 traverses the selected hierarchy in postorder, assigning non-negative integers to each member in the hierarchy. In Block 404, the encoder 122 determines whether all hierarchies have been selected. When all hierarchies have been selected, the encoder continues at Block 406, else the encoder 122 loops back to Block 400 to select the next hierarchy. In Block 406, the encoder 122 assigns a combined code to each member. In Block 408, the encoder 122 uses the combined code to identify descendants of each member.

With the encoder 122, a representation of the combined code is stored in lieu of the member in the DETAIL table data. Unless transformed, the length of the combined code is ($\log_2(h1 \times h2 \times h3 \times h4)$). If there are a million members belonging to ten hierarchies, the combined code for a member would be approximately 100 bits long. The amount of space used would be 100 bits multiplied by the number of records containing the combined code. However, the combined code has only a million unique values. It is the sparsity in the usage of the code space that makes the combined code long. A million unique values may be represented by 10 bits or less.

Various database compression techniques are known that reduce the amount of storage space used for such unique codes, for example, techniques described in B. Iyer and D. Wilhite, *Data Compression Support in Databases,* TR 03.547, April 1994, IBM Programming Systems, Santa Teresa Lab, San Jose, Calif., USA, which is incorporated by reference herein. These techniques may be regarded orthogonal to the method disclosed herein.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for an encoder for encoding members in a concept hierarchy. The present invention provides an improved system for encoding members of hierarchies. The present invention also encodes members of multiple, related concept hierarchies. Additionally, the present invention identifies descendants of a member based on the encoding.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a query in a computer, the query being performed by the computer to retrieve data from a database stored on a data storage device connected to the computer, the method comprising the steps of:

encoding members in the database related by one or more concept hierarchies, wherein the encoding represents one or more concepts; and identifying members in one of the concept hierarchies that are descendants of one or more selected concepts based on the encoding by traversing each of the members related by the concept hierarchies only once.

2. The method of claim 1 above, wherein the step of encoding further comprises the steps of:

traversing each of the members in each of the concept hierarchies in postorder; and assigning a label to each of the traversed members.

3. A method of executing a query in a computer, the query being performed by the computer to retrieve data from a database stored on a data storage device connected to the computer, the method comprising the steps of:

encoding members in the database related by one or more concept hierarchies by traversing each of the members in each of the concept hierarchies in postorder and assigning a label comprised of a non-negative integer to each of the traversed members; and identifying members in one of the concept hierarchies that are descendants of one or more selected concepts based on the encoding.

4. A method of executing a query in a computer, the query being performed by the computer to retrieve data from a database stored on a data storage device connected to the computer, the method comprising the steps of:

encoding members in the database related by one or more concept hierarchies by traversing each of the members in each of the concept hierarchies in postorder, assigning a label to each of the traversed members, assigning a combined code to each member of each hierarchy based on the assigned labels; and identifying members in one of the concept hierarchies that are descendants of one or more selected concepts based on the encoding.

5. The method of claim 4 above, wherein the step of identifying further comprises the step of using the combined code to identify members that are descendants of the selected concepts.

6. The method of claim 4 above, further comprising the steps of:

retrieving the combined code for a member; and determining the assigned label for that member for one or more of the concept hierarchies using the combined code.

7. An apparatus for executing a query, comprising:

a computer having a data storage device connected thereto, wherein the data storage device stores a database;

one or more computer programs, performed by the computer, for encoding members in the database related by one or more concept hierarchies, wherein the encoding represents one or more concepts, and for identifying members in one of the concept hierarchies that are descendants of one or more selected concepts based on the encoding by traversing each of the members related by the concept hierarchies only once.

8. The apparatus of claim 7 above, wherein the means for encoding further comprises:

means for traversing each of the members in each of the concept hierarchies in postorder; and means for assigning a label to each of the traversed members.

9. An apparatus for executing a query, comprising:

a computer having a data storage device connected thereto, wherein the data storage device stores a database;

one or more computer programs, performed by the computer, for encoding members in the database related by one or more concept hierarchies by traversing each of the members in each of the concept hierarchies in postorder and assigning a label comprising a non-negative integer to each of the traversed members and for identifying members in one of the concept hierarchies that are descendants of one or more selected concepts based on the encoding.

10. An apparatus for executing a query, comprising:

a computer having a data storage device connected thereto, wherein the data storage device stores a database;

one or more computer programs, performed by the computer, for encoding members in the database related by one or more concept hierarchies by traversing each of the members in each of the concept hierarchies in postorder, assigning a label to each of the traversed members, and assigning a combined code to each member of each hierarchy based on the assigned labels, and for identifying members in one of the concept hierarchies that are descendants of one or more selected concepts based on the encoding.

11. The apparatus of claim 10 above, wherein the means for identifying further comprises the means for using the combined code to identify members that are descendants of the selected concepts.

12. The apparatus of claim 10 above, further comprising:

means for retrieving the combined code for a member; and means for determining the assigned label for that member for one or more of the concept hierarchies based on the combined code.

13. An article of manufacture comprising a computer program carrier readable by a computer and embodying one or more instructions executable by the computer to perform method steps for executing a query, the query being performed by the computer to retrieve data from a database stored in a data storage device connected to the computer, the method comprising the steps of:

encoding members in the database related by one or more concept hierarchies, wherein the encoding represents one or more concepts; and identifying members in one of the concept hierarchies that are descendants of one or more selected concepts based on the encoding by traversing each of the members related by the concept hierarchies only once.

14. The method of claim 13 above, wherein the step of encoding further comprises the steps of:

traversing each of the members in each of the concept hierarchies in postorder; and assigning a label to each of the traversed members.

15. An article of manufacture comprising a computer program carrier readable by a computer and embodying one or more instructions executable by the computer to perform method steps for executing a query, the query being performed by the computer to retrieve data from a database stored in a data storage device connected to the computer, the method comprising the steps of:

encoding members in the database related by one or more concept hierarchies by traversing each of the members in each of the concept hierarchies in postorder and assigning a label comprising a non-negative integer to each of the traversed members; and identifying members in one of the concept hierarchies that are descendants of one or more selected concepts based on the encoding.

16. An article of manufacture comprising a computer program carrier readable by a computer and embodying one or more instructions executable by the computer to perform method steps for executing a query, the query being performed by the computer to retrieve data from a database stored in a data storage device connected to the computer, the method comprising the steps of:

encoding members in the database related by one or more concept hierarchies by traversing each of the members in each of the concept hierarchies in postorder, assigning a label to each of the traversed members, and assigning a combined code to each member of each hierarchy based on the assigned labels; and identifying members in one of the concept hierarchies that are descendants of one or more selected concepts based on the encoding.

17. The method of claim 16 above, wherein the step of identifying further comprises the step of using the combined code to identify members that are descendants of the selected concepts.

18. The method of claim 16 above, further comprising the steps of:

retrieving the combined code for a member; and determining the assigned label for that member for one or more of the concept hierarchies using the combined code.

* * * * *